United States Patent
Rovito et al.

(10) Patent No.: US 11,057,391 B2
(45) Date of Patent: *Jul. 6, 2021

(54) CONNECTED DEVICE RIGHTS MANAGEMENT ADMINISTRATION

(71) Applicant: Dwelo Inc., Provo, UT (US)

(72) Inventors: Michael Andrew Rovito, San Francisco, CA (US); Michael Taylor McGann, Provo, UT (US); Isaac Gregory Martin, San Francisco, CA (US); Eric Wood, Cedar Hills, UT (US); David James Beenfield, Lindon, UT (US)

(73) Assignee: DWELO INC., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/654,439

(22) Filed: Oct. 16, 2019

(65) Prior Publication Data

US 2020/0053092 A1   Feb. 13, 2020

Related U.S. Application Data

(63) Continuation of application No. 15/690,991, filed on Aug. 30, 2017, now Pat. No. 10,484,389.

(60) Provisional application No. 62/381,142, filed on Aug. 30, 2016.

(51) Int. Cl.
| | |
|---|---|
| *G06F 7/04* | (2006.01) |
| *H04L 29/06* | (2006.01) |
| *G05B 19/042* | (2006.01) |
| *G05B 15/02* | (2006.01) |
| *G06Q 30/06* | (2012.01) |

(52) U.S. Cl.
CPC ............ *H04L 63/102* (2013.01); *G05B 15/02* (2013.01); *G05B 19/042* (2013.01); *H04L 63/08* (2013.01); *G05B 2219/2614* (2013.01); *G05B 2219/2642* (2013.01); *G06Q 30/0645* (2013.01); *H04L 2463/102* (2013.01)

(58) Field of Classification Search
None
See application file for complete search history.

(56) References Cited

U.S. PATENT DOCUMENTS

| | | | |
|---|---|---|---|
| 7,441,043 B1* | 10/2008 | Henry | H04L 69/18 709/238 |
| 8,634,821 B2* | 1/2014 | Raleigh | H04L 41/0806 455/419 |
| 2016/0274553 A1* | 9/2016 | Strohmenger | G05B 17/02 |
| 2016/0284144 A1* | 9/2016 | Michalscheck | F16K 37/0025 |
| 2016/0285840 A1* | 9/2016 | Smith | H04W 12/0023 |

* cited by examiner

*Primary Examiner* — Brandon S Hoffman
(74) *Attorney, Agent, or Firm* — Thomas | Horstemeyer, LLP.; Jason M. Perilla

(57) ABSTRACT

Various aspects and embodiments of dwelling automation administration are described. Among other aspects or features of the embodiments, a dwelling automation system in a computing device authenticates a user. A management interface in the dwelling automation system generates a user interface for administering a plurality of automation devices at different dwellings based on access and control rights of the user. The user interface can grant the user access to at least one automation device associated with a hub associated with at least one dwelling.

20 Claims, 11 Drawing Sheets

CONNECTED DEVICE RIGHTS MANAGEMENT ADMINISTRATION

CROSS-REFERENCE TO RELATED APPLICATIONS

This application is a continuation of U.S. patent application Ser. No. 15/690,991, entitled "CONNECTED DEVICE RIGHTS MANAGEMENT ADMINISTRATION," filed Aug. 30, 2017, now U.S. Pat. No. 10,484,389, which claims the benefit of U.S. Provisional Application No. 62/381,142, filed Aug. 30, 2016, the entire contents of both of which are hereby incorporated herein by reference. This application is also related to U.S. Non-Provisional application Ser. No. 15/690,975, titled "AUTOMATIC TRANSITIONS IN AUTOMATION SETTINGS," filed on even date herewith, the entire contents of which are hereby incorporated herein by reference.

BACKGROUND

Some vendors offer property management software to assist rental property administrators with the management of interactions between property managers and new, current, and former residents. These tools can make it easier to manage properties, invoice for services and administer payments, onboard new residents, execute leases, etc. Some resident management software platforms provide resident screening, accounting, and reporting tools to help property managers and other stakeholders to know how different properties, groups of properties, and rental units at various locations are doing financially.

In a separate field, home or building automation includes the control and automation of lighting, door lock, appliance, security system, heating, ventilation, air conditioning (HVAC), window covering, and other automation devices, as well as air temperature, air quality, water, and other sensor devices. In that context, automation systems can include a number of automated, locks, switches, sensors, and other devices connected to a central automation hub or gateway through which the system is controlled. Many different user interfaces can be used to control such home or building automation systems, such as wall mounted terminals, web-based interfaces, and mobile phone applications, for example.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

FIGS. 4-11 illustrate example user interfaces generated by the automation environment in the networked environment shown in FIG. 1 according to various examples described herein.

DETAILED DESCRIPTION

Figure 1:
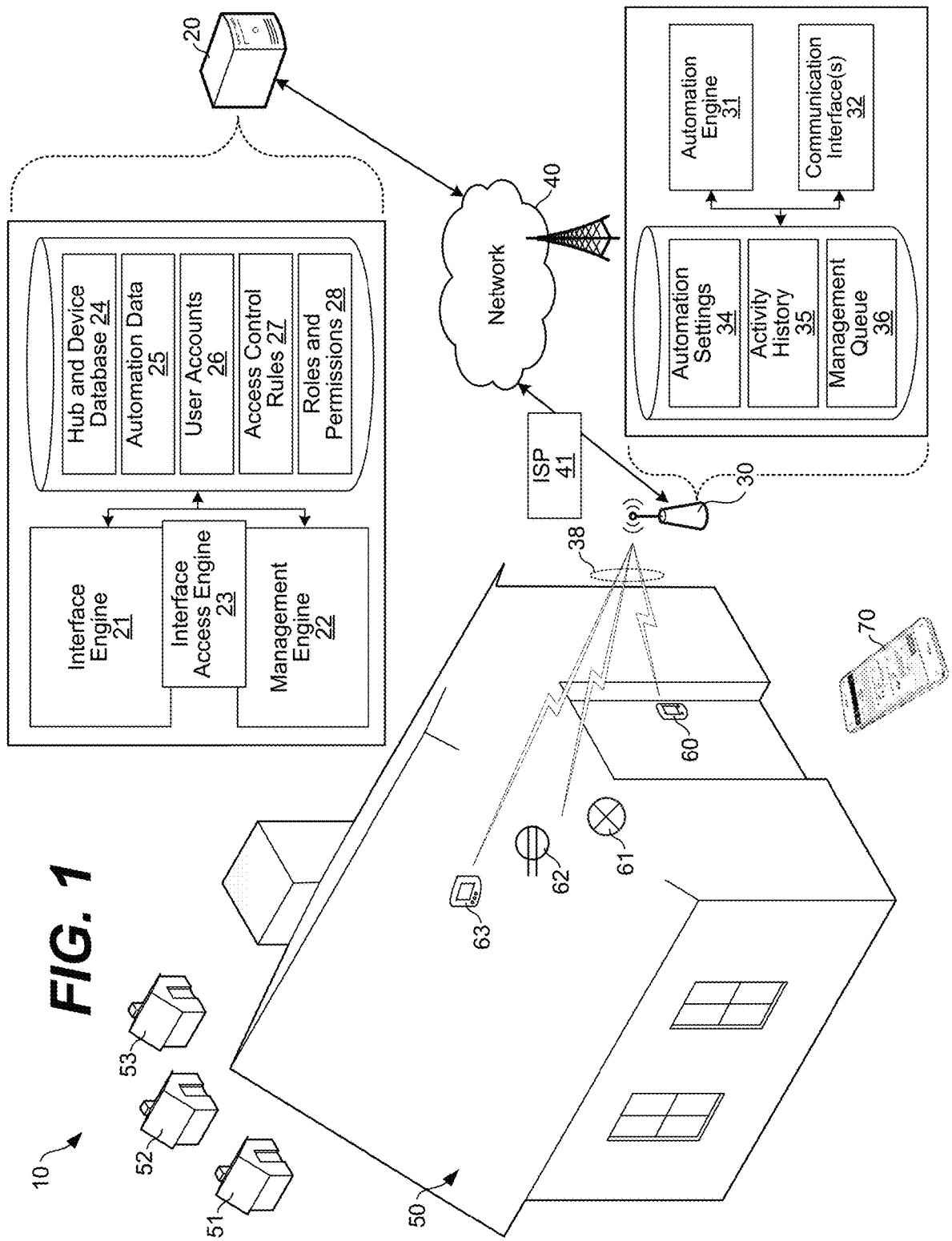
FIG. 1 illustrates an example networked environment for automation rights management administration according to various examples described herein.

As noted above, property management software platforms can assist administrators in the management of interactions between property managers and residents. Certain resident management software platforms provide resident screening, accounting, and reporting tools to help property managers and other stakeholders.

In a separate field, home and building automation systems and devices provide the means to remotely control and automate lighting, door lock, heating, ventilation, and air conditioning (HVAC), window covering, air temperature, quality, water, and other sensors, appliances, security systems, and other systems in dwellings, rental units, etc. In that context, automation systems can include a number of automated, locks, switches, sensors, and other devices connected to a central automation hub or gateway through which the system is controlled. Many different user interfaces, accessible through different types of client devices, can be used to interface with such home or building automation systems.

However, conventional software platforms for the management of residential properties are not integrated with home and building automation systems. Thus, even if a manager or owner of a number of rental units were to update the door locks, thermostats, lighting systems, etc. in the rental units, the manager still would not be able to administer those devices and systems efficiently and effectively. For example, the manager would not be able to remove the previously-used PIN codes (e.g., of former residents) from the automated door locks of rental units that have gone vacant in any given month by addressing all the automated door locks as a logical group. Instead, the manager would be left with individually accessing and addressing the door locks in those rental units to remove the used PIN codes. Similarly, the manager would be left without a way to view the status of several thermostats, lighting systems, etc. in various rental units using a single user interface for efficient and effective administration.

There are other cases in which a property manager or other individual might need to efficiently administer and monitor automation systems at certain locations. For example, the manager may need to turn off lighting fixtures in several rental units (or confirm that they are turned off) to mitigate electricity costs, adjust the thermostat settings of the rental units to mitigate heating and/or cooling costs, and monitor for certain conditions such as air quality, water leaks, etc. during periods of vacancy of the rental units. Even when rental units are occupied, the manager may need to offer a means for maintenance and/or service personnel to have temporary access to the rental units for routine property maintenance.

According to aspects of the embodiments described herein, the ability to administer, monitor, and use various automation devices and systems in a networked environment is connected to a rights management engine. The rights management engine controls access to various features and functions of the automation devices and systems based on access and control factors defined for the devices and the different roles and permissions of the users of the system.

The access and control factors can define accessibility to certain automation devices based on a number of different factors, such as the time of day or day of week, the geographic locations of users, the rental status of units, the payment activity of residents, city ordinances or protocols, the definition of predefined events, the definition of one- or multiple-time use events, and other control factors. The roles and permissions of the users of the system can define multiple categories of users, such as administrators, security personnel, maintenance personnel, staff personnel, residents, guests, etc. The access control factors, roles and permissions, and other status data can be evaluated by the system to identify whether or not various users should be permitted a right to access certain functions of certain connected or automation devices. Similarly, the access control factors, roles and permissions, and other status data can be evaluated by the system to identify whether or not various users should be denied access to (i.e., identify no right to access) certain functions of certain connected or automation devices.

Depending upon the access and control factors and the roles and permissions of the users, the embodiments described herein can permit or deny access of certain users to various automation features or functions. To facilitate such administration, one example embodiment includes the generation and adaptation of a different user interfaces for different users at different times. The interfaces can either permit or deny access to a number of different automation features or functions, possibly for a number of different automation devices, based on an evaluation of the access control factors, roles and permissions, and other status data.

The concepts described herein distinguish between the administration of automation devices used in common spaces, such as in shared rooms, gyms, pools, and other common areas, as compared to automation devices used in personal dwellings or units. Thus, the embodiments can be extended to administer access through exterior doors, perimeter fences, parking gates, and other shared gateways. The embodiments can also be extended to administer access to mailboxes, lockers, lockboxes, and other private and/or restricted-access areas.

Turning to the drawings, the following paragraphs introduce a networked environment for automation rights management administration, followed by a description of the operation of the same. FIG. 1 illustrates an example networked environment 10 for automation rights management administration according to various examples described herein. Among other elements, the networked environment 10 includes a computing environment 20 which operates as an automation management service environment (also "automation environment 20"), a computing device 30 which operates as an automation hub or gateway (also "automation hub 30" or "hub 30"), a network 40, various units or dwellings 50-53, various automation devices 60-63 in the dwelling 50, and a client device 70.

The networked environment 10 is provided as an example for discussion. In other implementations, the concepts described herein can be applied to other arrangements of computing devices and computer networks. For example, the networked environment 10 can include additional (or fewer) computing environments (e.g., network or cloud-based servers, etc.), computing devices (e.g., automated hub or gateway devices, client computing devices, etc.), automation devices, and other components. Further, certain components can be omitted in some embodiments.

Although the dwellings 50-53 are illustrated as separate homes in FIG. 1, the concepts described herein can be extended or applied to any number of rooms, cooperative units, condo units, apartment units, townhomes, single family homes, student housing units, military housing units, corporate housing units, office spaces, other work and dwelling spaces, and combinations thereof. Although not shown in FIG. 1, the concepts can also be extended for use with automation devices installed on exterior doors, perimeter fences, parking gates, and other shared gateways of buildings and communities. In any case, the automation devices 60-63 in the dwelling 50, as well as other automation devices in the dwellings 51-53, can be collectively administered as a type of community of connected devices by the automation environment 20.

The automation environment 20 can operate as an environment for automation rights management administration. The automation environment 20 can be embodied as one or more computers arranged in server banks and can be located at a single installation site or distributed among different geographical locations. The computers can include an arrangement of computing devices that together embody a hosted computing resource, a grid computing resource, or other distributed computing arrangement. In some cases, they can be embodied as an elastic computing resource where an allotted capacity of processing, network, storage, or other computing-related resources varies over time. As described in further detail below, they can also be embodied, in part, as certain functional or logical elements, such as executable computer-readable instructions (e.g., software), firmware, or other functional or logical components, that direct the automation environment 20 to perform the functions described herein.

As shown in FIG. 1, the automation environment 20 includes an interface engine 21, a management engine 22, and an interface access engine 23. The interface engine 21, management engine 22, and interface access engine 23 are representative of functional or logical elements, such as executable computer-readable instructions (e.g., software), firmware, or other functional or logical components, that direct the automation environment 20 to perform the functions described herein. Among other components, the automation environment 20 also includes a memory or data store. As shown in FIG. 1, the memory can be used to store various types of data and/or data structures, including a hub and device database 24, automation data 25, user accounts 26, access control rules 27, and roles and permissions 28.

In one embodiment, the interface engine 21 is configured to generate, administer, and/or adapt one or more user interfaces or interface elements for control of the operation of the management engine 22. For example, the interface engine 21 can generate various network pages for display on a web browser or application executing on the client device 70. A user of the client device 70 (among other client devices) can monitor and control the operations of the management engine 22 using the user interfaces or interface elements generated and adapted over time by the interface engine 21. As described herein, the interface engine 21 can generate network pages that either enable or disable (e.g., permit or deny access to) certain features or functions of the automation devices 60-63, among others.

In another embodiment, rather than generating network pages for display on a web browser, the interface engine 21 is configured to direct or control certain operations of one or more stand-alone user interface applications (e.g., "apps") executing on the client device 70. In that sense, the interface engine 21 can adapt the stand-alone user interfaces to enable or disable (or permit or deny access to) certain features or functions of the automation device 60-63, among others. In any case, the interface engine 21 is configured to generate different (e.g., tailored) interfaces for administrators, maintenance, and staff personnel, and generate different interfaces for residents, guests, and other individuals. The differences between those interfaces can be determined, in part, based on the evaluation performed by the interface access engine 23.

As described in further detail below, the interface engine 21 can permit (and deny) access to control the management engine 22 based on the credentials, access rights, roles, and/or permissions attributed to various users. To that end, the interface access engine 23 is configured to assist the interface engine 21 with the evaluation of user credentials, status data, and other data against the access control rules 27 and the roles and permissions 28. For example, the interface access engine 23 is configured to perform user authentication and/or identification before any given user is permitted access to the management engine 22. The interface access engine 23 is also configured to evaluate user credentials, status data, and other data against the access control rules 27 and the roles and permissions 28. The interface engine 21 can then enable or disable certain features or functions of the automation devices 60-63, among others, based on the evaluation performed by the interface access engine 23.

The management engine 22 is configured to control the settings and monitor the status of the automation devices 60-63 in the dwelling 50 in a managed, coordinated manner. Similarly, the management engine 22 is configured to control the settings and monitor the status of other automation devices in the dwellings 51-53 (among others) in a managed, coordinated manner.

The dwellings 50-53 are representative of one or more units, rooms, cooperatives, condos, apartments, townhomes, single family homes, student housing units, military housing units, corporate housing units, office spaces, and other spaces which can include automation devices managed by the automation environment 20. In that context, although four dwellings 50-53 are shown in FIG. 1, the management engine 22 can control or manage the operation of automation devices at tens, hundreds, thousands, tens of thousands, or more units. Additionally, the embodiments are not limited to use with any particular type of dwelling or unit, as the concepts described herein can be applied to any space in which automation devices can be installed. Thus, the embodiments can be extended to use with exterior doors or large buildings, perimeter fences, parking gates, and other shared gateways.

The hub and device database 24 includes data related to the automation hubs installed at the dwellings 50-53, including the automation hub 30 installed at the dwelling 50, among others. The hub and device database 24 can include information regarding the geographic locations, postal addresses, square footages, equipment and appliances, facilities, residents, rental histories, owners, automation devices, automation hubs, and other information about the dwellings 50-53. Further, the hub and device database 24 can include data that associates individual automation hubs with individual dwellings 50-53. For example, in the hub and device database 24, the automation hub 30 can be identified by a unique hardware identifier and associated with the geographic location or postal address of the dwelling 50 in a table or similar data structure.

The hub and device database 24 can also categorize or organize the dwellings 50-53 (among others) into one or more logical groups of units. By logically organizing dwellings into groups, the management engine 22 can uniformly apply automation settings to a group of dwellings without the need for a user to apply those settings to the dwellings in the group individually. For instance, if the dwellings 50-53 were logically organized to be managed together, a user of the automation environment 20 could define and apply the same temperature settings and schedules for the thermostats in all of the dwellings 50-53 in one (or a limited number of) operations through the interface engine 21.

The automation data 25 includes data related to the features and functions of the connected or automation devices 60-63 at the dwelling 50, as well as the automation devices at the dwellings 51-53. For example, the automation data 25 can specify which automation devices 60-63 are capable of locking and unlocking doors, turning lights on and off, and performing other automation functions. The automation data 25 also includes data related to the current state and status of the automation devices 60-63 at the dwelling 50, as well as the automation devices at the dwellings 51-53. For example, the automation data 25 can include data related to the current state of doors (e.g., locked, unlocked, etc.), thermostats (e.g., current and set-point temperatures, schedules, etc.), lights, alarms, appliances, windows, and other aspects of home automation. The automation data 25 can also include preset or default values for the automation devices 60-63 and others, so that the settings of the automation devices 60-63 can be restored to default values.

The automation data 25 can also specify certain attributes related to the automation devices 60-63, among others in the networked environment 10. The attributes can specify the make, model, and version numbers of the automation devices 60-63, the physical locations where the automation devices 60-63 are installed, a role or permission level required to access the automation devices 60-63, certain time or date ranges in which access to the automation devices 60-63 is permitted or denied, and other attributes.

The attributes in the automation data 25 can also be used to logically organize the automation devices 60-63 into certain categories of devices. For example, the attributes stored in the automation data 25 can specify whether each of the automation devices 60-63, among others, is installed in a shared or common area in a condo building, to be distinguished from service and maintenance areas in the building. Those categories can also be distinguished from individual units in the condo building. The attributes can also be used to logically organize access permissions by certain individuals (or categories of individuals) based on the access control rules 27 and/or the roles and permissions 28.

The attributes stored in the automation data 25 can be referenced by the management engine 22 and/or the interface access engine 23 to evaluate whether or not certain individuals should be permitted to have access to the features or functions of the automation devices 60-63, among others. For example, the attributes of the automation device 60 may specify that only certain individuals (e.g., based on user credentials) have the right to access (e.g., use, configure, change, etc.) the features of the automation device 60. On the other hand, an automation device installed in a common area shared by several residents of a building may specify that all residents of the building have the right to access the features of the automation device. As another example, the attributes may specify that all residents should be granted the right to use or control an automation device (e.g., change the temperature of a thermostat) temporarily but not configure the settings of the automation device (e.g., change the default set point). The attributes may also specify that certain individuals should be denied access to the features of various automation devices.

The data in the hub and device database 24 can be structured to logically organize or group hubs among the dwellings 50-53 and automation devices installed in the dwellings 50-53 into groups or classes. Similarly, the data in the automation data 25 can be structured to logically organize the features and functions of the automation devices installed in the dwellings 50-53 into groups or classes.

On the basis of the logical organization of the dwellings 50-53, the hubs in the dwellings 50-53, and the automation devices in the dwellings 50-53, the management engine 22 can develop and adapt user interfaces to configure automation settings among certain groups of hubs and automation devices without the need for a user to apply those settings to individual hubs or automation devices. For instance, if the hubs in the dwellings 50-53 were logically organized for management as a group by a user having administrator or manager credentials, then such a user could define and apply the same temperature settings and schedules for the thermostats in all the dwellings 50-53 in one (or a limited number of) operations using a user interface administered by the interface engine 21. To that end, the interface access engine 23 is configured to identify the rights of users to access the functions of the automation devices in the dwellings 50-53. The identification of those rights can be based on an evaluation of the credentials of those users against the access control rules 27 and the roles and permissions 28. Once the rights to access the functions have been identified, the interface engine 21 is configured to adapt the user interface to enable the ability to administer those functions for those automation devices.

The user accounts 26 include data associated with the users of the automation environment 20. Each account in the user accounts 26 can be classified as having a certain role with certain permissions depending upon the type or role of the associated user. As one example, users can be classified as administrators, security personnel, maintenance personnel, staff, or other types of personnel. Users can also be classified as current or former residents, owners, guests, or other types of users. Each user account is typically associated with one or more user credentials, such as a username and password, token, or other means of authentication. Similar to the manner in which the data in the hub and device database 24 and the data in the automation data 25 can be logically organized, the user accounts 26 can be logically organized into groups having roles, for example.

The ability of administrators and residents, for example, to view, define, and/or modify the automation data 25 can follow rules or conventions as defined by the access control rules 27 and/or the roles and permissions 28. Similarly, the ability of various users to control the ad hoc logical grouping of automation devices and the features of automation devices, the ability to create or modify permissions for other users, and other conditions, can follow rules or conventions as defined by the access control rules 27 and/or the roles and permissions 28.

The access control rules 27 define the conditions for which certain users of the automation environment 20 are permitted to have access to the features or functions of certain hubs and/or automation devices in the networked environment 10. The access control rules 27 can also define the conditions for which certain users are constrained against such access. As described in further detail below, the access control rules 27 can define conditional access for individual users based on a number of different factors, such as user credentials, the respective roles (e.g., administrator, security, maintenance, staff, resident, guest, etc.) of individual users, the current geographic locations of individual users, the time of day, day of week, and other factors.

The roles and permissions 28 define a number of different categories of users of the automation environment 20. The roles and permissions 28 can be referenced by the management engine 22 and/or the interface access engine 23 to evaluate whether certain users or categories of users should be permitted access to features of various automation devices.

Turning to the automation hub 30, it can be embodied as a general- or specific-purpose embedded computing device, including one or more general- or specific-purpose processors, state machines, programmable logic devices, and one or more memory devices configured to perform the functions described herein. The automation hub 30 can be embodied, in part, using a system-on-chip (SOC) processor, for example, and can be mounted on a printed circuit board for integration or use with a memory, one or more wired or wireless physical layer communications devices, one or more display devices, and other components and subsystems. As one example, the automation hub 30 can be embodied, in part, using one or more of the single-board computers described at http://en.wikipedia.org/wiki/Comparison of single-board computers, or equivalents thereof. As another example, the automation hub 30 can be embodied as a network router, access point, or similar devices.

As shown in FIG. 1, the automation hub 30 includes an automation engine 31 and one or more communications interfaces 32. The automation hub 30 also includes a memory or data store. The memory includes automation settings 34, activity history 35, and a management queue 36. The automation engine 31 is configured to set the operating parameters of and monitor the operating status of the automation devices 60-63, among others, in the dwelling 50. The operating parameters of the automation devices 60-63 can be set based on the automation settings 34. To set the operating parameters of the automation devices 60-63, the automation engine 31 can communicate with the automation devices 60-63 using the communications interfaces 32 according to either wired or wireless communications standards and/or protocols, such as X10®, ZigBee®, Z-Wave®, IEEE 802.15.4, IEEE 1901, or IEEE 802.11, among others.

Thus, the communications interfaces 32 of the automation hub 30 can include one or more physical layer communication devices for data communications with the automation environment 20 over the network 40 and one or more other physical layer communication devices for data communications with the home automation devices 60-63 over the channels 38, which can include a combination of wired and wireless channels. The physical layer communication devices for data communications over the network 40 can include wired, wireless, or a combination of wired and wireless interfaces, including cellular interfaces. Similarly, the physical layer communication devices for data communications over the channels 38 can include wired, wireless, or a combination of wired and wireless interfaces, including cellular interfaces.

As representative examples, the automation devices 60-63 shown in FIG. 1 can be associated with door locks, light fixtures, appliances, thermostats, blinds, video cameras, sensors, security system devices, and other automation devices. The dwelling 50 can include other automation devices, such as air temperature, air quality, water, smoke, and other sensors. To communicate with the automation hub 30, each of the automation devices 60-63 can include a network communications stack having a combination of application, transport, and physical network access layers, such as X10®, ZigBee®, Z-Wave®, IEEE 802.15.4, IEEE 1901, or IEEE 802.11 layers, among others.

In part, the operations of each of the automation devices 60-63 can be controlled or directed by certain parameters and settings resident in memory. For example, the automation device 60 can be programmed by the automation hub 30 to unlock a door when one or more PIN codes are entered by an individual using a keypad or when key data is received by near-field communications with the client device 70. Similarly, the automation device 61 can be programmed by the automation hub 30 to set a target HVAC temperature for the dwelling 50. Those automation features and settings of the automation devices 60-63, among others, can be managed, in part, by the automation environment 20 (and stored as the automation data 25). Those same automation settings can be communicated to the automation hub 30 (and stored as the automation settings 34) by the automation environment 20. Finally, they can be communicated to the automation devices 60-63 by the automation hub 30.

The automation devices 60-63 can also communicate various types of status and control data back to the automation hub 30, and that data can be stored as activity history 35. The status and control data can include various data gathered by sensors of the automation devices 60-63. For example, the data can indicate when doors are opened at the dwelling 50, the temperature in the dwelling 50, the on/off status of outlets, fixtures, and appliances at the dwelling 50, power usage at the dwelling 50, and other status information related to the automation devices 60-63. That status and control data can be stored as the activity history 35 and, in some cases, communicated by the automation hub 30 to the automation environment 20 for reference and processing by the management engine 22.

The network 40 can include the Internet, intranets, extranets, wide area networks (WANs), local area networks (LANs), wired networks, wireless networks, cellular networks, cable networks, satellite networks, other suitable networks, or any combinations thereof. Although not shown in FIG. 1, the networked environment 10 can also include communicative connections to any number and type of network hosts or devices, such as website servers, file servers, cloud computing resources, databases, data stores, or any other network or computing architectures. The ISP 41 can include any provider of internet or data communications services, such as a "last-mile" internet service provider.

The devices in the networked environment 10 can communicate with each other using various application layer, transport layer, and internet layer protocols and systems interconnect frameworks. For example, the computing devices can communicate with each other using hypertext transfer protocol (HTTP), file transfer protocol (FTP), internet message access protocol (IMAP), real-time transport protocol (RTP), simple object access protocol (SOAP), representational state transfer (REST), real-time transport protocol (RTP), real time streaming protocol (RTSP), real time messaging protocol (RTMP), transmission control protocol (TCP), user datagram protocol (UDP), internet protocol (IP), other protocols and interconnect frameworks, and combinations thereof.

The client device 70 can be embodied as any computing device, processing circuit, or processor based device or system, including those in the form of a desktop computer, a laptop computer, a tablet computer, a personal digital assistant, a cellular telephone, a wearable computing device, or a set-top box, among other example computing devices and systems. The client device 70 can include various peripheral devices or components. The peripheral devices can include input or communications devices or modules, such as keyboards, keypads, touch pads, touch screens, microphones, cameras, wireless communications modules (e.g., infra-red, WiFi, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the client device 70.

The client device 70 can execute various applications. The applications can include hypertext-based network browsers, such as the Internet Explorer®, Firefox®, Chrome®, Safari®, or Silk® browsers, among other types of browsers. Such a browser can be used to access the automation environment 20 and render a user interface presented by the interface engine 21. The client device 70 can also execute stand-alone user interface applications (e.g., "apps"), including an application dedicated to the administration of automation devices.

In a variation on the embodiments described above, one or more of the home automation devices 60-63 can include cellular-based communications components. Thus, the home automation devices 60-63 can communicate directly with the automation environment 20 in some cases. Under that logical communications structure, the functions of the automation hub 30 can be, at least in part, incorporated into the automation environment 20, and the automation environment 20 can load automation settings into and/or directly command the home automation devices 60-63. In some cases, the automation environment 20 and the automation hub 30 can work in concert together to command certain ones of the home automation devices 60-63 based on various factors including the communications capabilities of the home automation devices 60-63, WiFi- vs. cellular-based communications network costs, communications network latency, and other factors. The automation environment 20 and the automation hub 30 can offer redundancy to each other, offer additional communications and device command options to each other, and generally work together to implement the concepts described herein.

Figure 2:
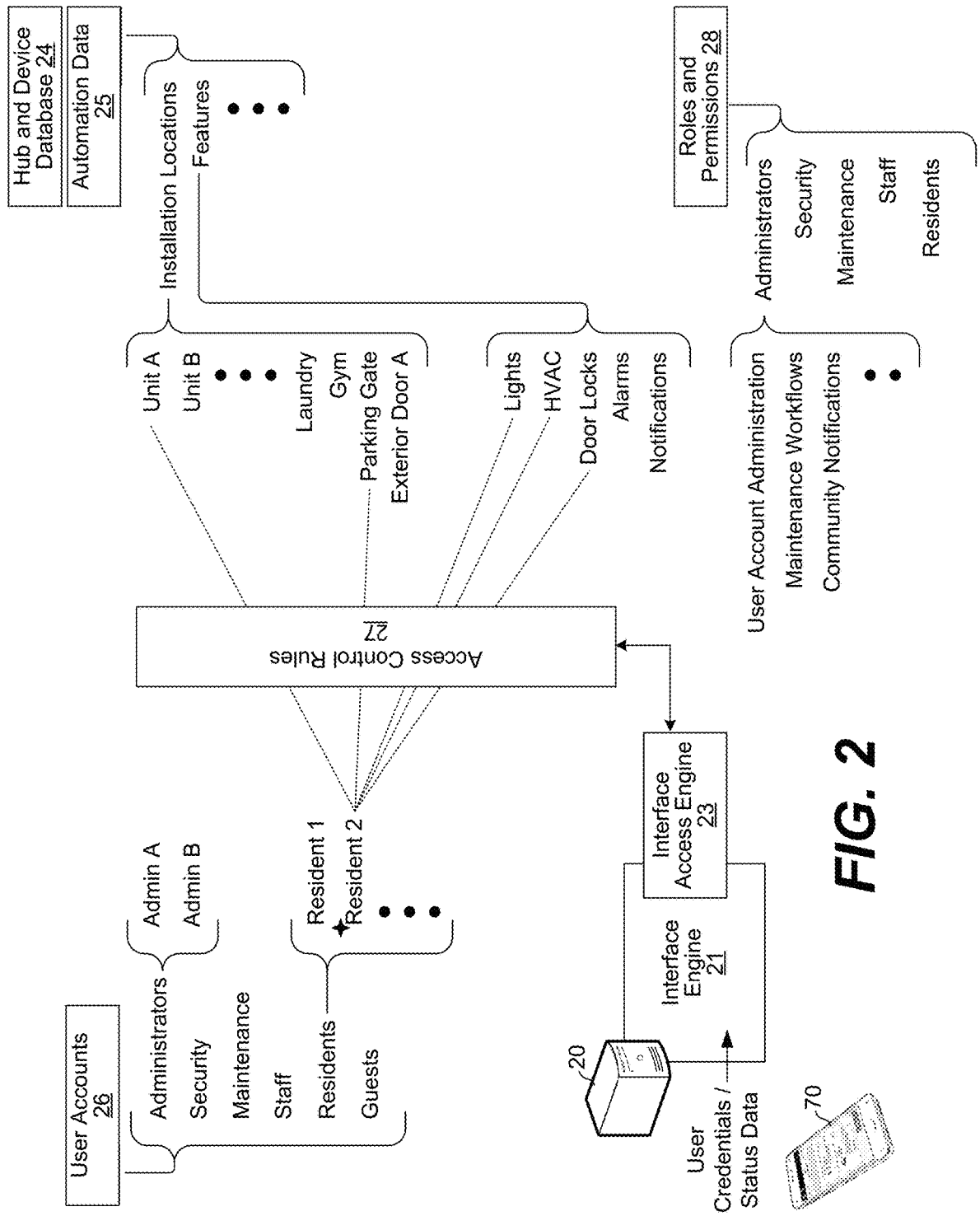
FIG. 2 illustrates an example rights management evaluation performed by an automation environment shown in FIG. 1 according to various examples described herein.

Turning to other examples, FIG. 2 illustrates an example rights management evaluation performed by the automation environment 20 shown in FIG. 1. FIG. 2 is provided as a representative example for one user of one client device. In practice, the automation environment 20 can evaluate the access rights of any number of users for any number of client devices.

As shown in FIG. 2, the user accounts 26 can be logically organized into different types or roles of users, including administrators, security, maintenance, and staff personnel, residents, and guests. At the same time, the automation devices 60-63, among others, can be logically organized into devices installed at different locations and devices associated with different features, among other categories. Further, based on the roles and permissions 28, different roles and workflows can be associated with different users. The organization illustrated in FIG. 2 is provided as a representative example for discussion. The embodiments are not limited to any particular organization of user accounts, devices, features, roles, etc.

As shown in FIG. 2, a user of the client device 70 can seek access to the automation environment 20 by transmitting user credentials to the automation environment 20 via the network 40, for example (see FIG. 1). The user credentials can include a username and password, token, or other means of authenticating the user of the client device 70. In some cases, the client device 70 can also transmit status data to the automation environment 20. The status data can include information gathered by the client device 70, such as a geographic location of the client device 70 (e.g., as determined by GPS, network triangulation, etc.), the network to which the client device 70 is connected, or other relevant status data.

In turn, the interface access engine 23 can authenticate and verify the identity of the user of the client device 70 based on a comparison between the user credentials received from the client device 70 and data stored in the user accounts 26, for example. In the example shown in FIG. 2, the user is identified as "Resident 2" based on the user credentials. The user can also be identified as being a resident of a certain unit or dwelling.

Once the user of the client device 70 is identified, the interface access engine 23 can proceed to evaluate the access control rules 27 as they apply to the user. This evaluation can proceed in any suitable way. As one example, the interface access engine 23 can first determine a role associated with the user. Based on the logical organization of the user accounts 26, the user of the client device can be identified as a "Resident" and, more particularly, "Resident 2." At the same time, the roles and permissions 28 defines certain workflows and/or permissions associated with the "Resident" role for the user of the client device 70.

The roles and permissions 28 can define certain workflows and/or permissions associated with administrators, security, maintenance, and staff personnel, residents, guests, etc. Administrators are generally afforded rights that are not provided to other users. Based on the roles and permissions 28, for example, the interface access engine 23 can give administrators the ability to administer user accounts, review and administer maintenance workflows, create and distribute community notifications, and perform other tasks.

As other examples, the security personnel can be afforded rights to operate certain automation devices, such as those installed at exterior doors, perimeter fences, parking gates, and other shared gateways. Maintenance personnel can be afforded rights to operate automation devices for building HVAC and other systems, and staff can be afforded rights to operate automation devices for locks on certain doors, etc. Residents, on the other hand, can be afforded rights to operate the automation devices in certain dwellings or units, as well as certain automation devices associated with shared or common areas in a building or community.

Now, with reference to the access control rules 27, the interface access engine 23 can evaluate the access rights of the user of the client device 70 based on the "Resident" role of the user, the credentials of the user, and the status data received from the client device 70. The access rights can be separately evaluated in terms of the automation devices and the features or functions of those automation devices. As shown in FIG. 2, the interface access engine 23 can identify that the user of the client device 70 has rights to access certain automation devices associated with "Unit A" because, for example, the user may be a resident associated with that unit. It can also identify that the user has rights to access an automation device associated with a parking gate. As for the features or functions of those devices, the interface access engine 23 can identify that the user has rights to access the lights, HVAC, and door lock features of the automation devices associated with "Unit A".

Additionally, the interface access engine 23 can evaluate constraints against access to features or functions of automation devices based on the "Resident" role of the user, the credentials of the user, and the status data received from the client device 70. As shown in FIG. 2, for example, the user of the client device 70 is constrained from having access to the automation devices in the laundry room and gym, among others.

According to the access control rules 27, access to certain automation devices can also be limited or constrained based on the status data received from the client device 70. If the status data indicates that the client device 70 is within or outside a geographic region, for example, the interface access engine 23 can constrain access to one or more of the lights, HVAC, or door lock features of the automation devices associated with "Unit A".

Based on the evaluation performed by the interface access engine 23, the interface engine 21 is configured to adapt one or more user interfaces presented on the client device 70. The interface engine 21 can adapt the user interfaces to present controls for only those automation devices and/or features of those automation devices for which the user of the client device 70 has a right to access. The interface engine 21 can also adapt the user interfaces to remove or omit controls for those automation devices for which the user of the client device 70 is denied access to. Thus, the user interfaces generated by the interface engine 21 can take various forms for different users. As an example, the residents can be provided with user interfaces that would be similar to those provided for traditional single-family home automation providers.

The interface engine 21 can be configured provide administrators, on the other hand, with user interfaces that enable them to administer the user accounts 26, the hub and device database 24, the automation data 25, and the roles and permissions 28. Those user interfaces can also be used to monitor the status of automation devices in various rental units, add and onboard (e.g., manage) new users, grant and revoke users access to the automation capabilities in certain units, and control the automation capabilities in certain rental units. Administrator user interfaces can also be used to see a list of units, the vacancy status of those units, staff members assigned to those units, and the automation settings of automation devices at those unit, and other information.

Maintenance-directed user interfaces, as another example, could include interface components for the initiation and assignment of work tickets via an automated workflow that begins with a resident reporting the need for some maintenance. The maintenance report instance can be routed to a property manager for assignment to maintenance personnel for resolution, as one example of the workflow. The maintenance-directed interfaces can also lead to the automated assignment of access to units or dwellings as part of the workflow. Additionally, the maintenance-directed interfaces can facilitate embedding digital content such as pictures to demonstrate issues or problems.

The interface engine 21 can also generate user interfaces in which automation devices for several units or dwellings are associated into a group that can be logically organized and administered together. In that case, an administrator or other user can filter a list of units by status (e.g., vacant, occupied, etc.) and collectively administer settings for all units having a particular status. The interface engine 21 can also generate user interfaces associated with onboarding workflows. An example onboarding workflow can begin with an email from an administrator or manager, continue through the onboarding workflow, and lead to a user being granted access to a unit.

Figure 3:
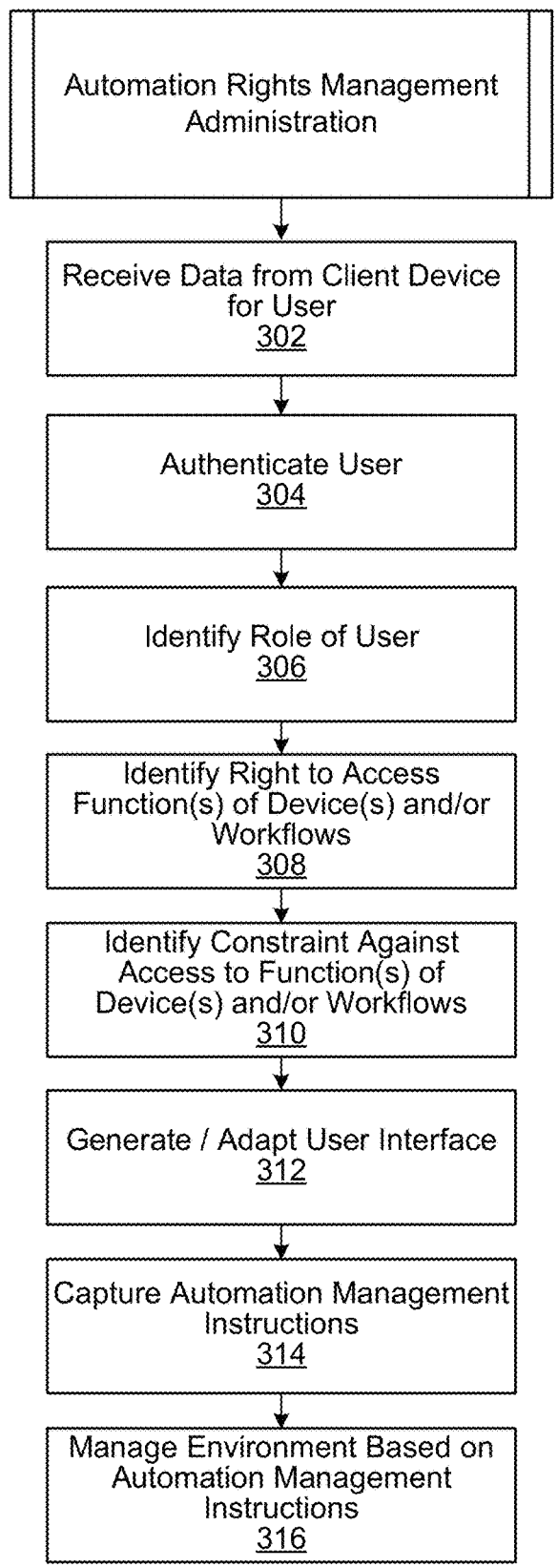
FIG. 3 illustrates an example process of automation rights management administration performed by the automation environment shown in FIG. 1 according to various examples described herein.

FIG. 3 illustrates an example process of automation rights management administration performed by the automation environment 20 shown in FIG. 1 according to various examples described herein. The process shown in FIG. 3 is described below as being performed by the interface engine 21, the management engine 22, and the interface access engine 23 in the automation environment 20. However, other computing devices and systems can perform the process. Although FIG. 3 shows an order of execution, the order of execution can differ from that which is shown. For example, the order of execution of two or more elements or steps can be switched relative to the order shown or as described below. Two or more elements shown in succession can be executed concurrently or with partial concurrence, and one or more of the elements can be skipped or omitted. Further, while the process flow shown in FIG. 3 is provided as an example associated with one user of one client device, multiple processes for a number of different users of different client devices can be processed concurrently.

At step 302, the process includes the automation environment 20 receiving user credential data and status data from the client device 70 for a user of the client device 70. The data can be received over the network 40, for example. The user credential data can include a username and password, token, or other means of authentication. The status data can include information gathered by the client device 70, such as a geographic location of the client device 70 (e.g., as determined by GPS, network triangulation, etc.), the network to which the client device 70 is connected, or other relevant status data.

At step 304, the process includes the interface access engine 23 authenticating the user of the client device 70. The interface access engine 23 can authenticate and verify the identity of the user of the client device 70 based on a comparison between the user credentials received from the client device 70 and data stored in the user accounts 26, for example. Alternatively, at step 304, the interface access engine 23 can fail to identify and/or authenticate the user, in which case the process can end.

At step 306, the process includes the interface access engine 23 identifying a role of the user of the client device 70. The role of the user can be identified with reference to a comparison of the user credentials and data stored in the user accounts 26. The role can be identified as an administrator, security, maintenance, staff, resident, guest, or other role.

At step 308, the process includes the interface access engine 23 identifying the rights of the user of the client device 70 to access certain functions of certain automation devices. With reference to FIG. 2, for example, the rights of the "Resident 2" user to access a number of different functions of different automation devices is described. The process can also include identifying the right of the user to access certain workflows and/or administrative functions. The roles and permissions 28 can define certain workflows and/or permissions associated with administrators, security, maintenance, and staff personnel, residents, guests, etc. Administrators are generally afforded rights that are not provided to other users.

At step 310, the process includes the interface access engine 23 identifying constraints on access to certain functions of certain automation devices. The process also includes identifying constraints on access to certain workflows and/or administrative functions.

At step 312, the process includes the interface engine 21 generating and adapting one or more user interfaces for rendering and display on the client device 70 based on the access rights and constraints identified at steps 308 and 310. In that context, the interface engine 21 can generate, administer, and/or adapt one or more user interfaces or interface elements for control of the operation of the management engine 22. The interface engine 21 can generate network pages that either enable or disable (e.g., permit or deny access to) certain features or functions of certain automation devices. Alternatively, rather than generating network pages for display on a web browser, the interface engine 21 can direct or control operations of one or more stand-alone user interface applications (e.g., "apps") executing on the client device 70.

At step 314, the process includes the management engine 22 capturing automation management instructions from the client device 70 through the user interfaces adapted for and presented on the client device 70 by the interface engine 21 at step 312. The automation management instructions can include instructions to direct the operations of the automation devices 60-63, for example, among others, to lock or unlock doors, change the settings on thermostats, etc. It should be appreciated, however, that the automation management instructions cannot extend or be directed in any case to any automation features or devices for which the user of the client device 70 did not have rights to access.

In some cases, such as if the user of the client device 70 was identified at step 306 as an administrator, the automation management instructions could potentially include instructions to change or update data in the user accounts 26, the hub and device database 24, the automation data 25, and the roles and permissions 28. Similarly, the instructions can be directed to performing certain workflows.

At step 316, the process includes the management engine 22 managing the automation environment 20 and/or automation devices in the networked environment 10 based on the automation management instructions captured from the client device 70 at step 314. Thus, the management engine 22 can send instructions to one or more automation hubs, such as the automation hub 30 shown in FIG. 1, to direct certain functions of one or more of the automation devices 60-63. The process can also include the management engine 22 making changes or updates to the user accounts 26, the hub and device database 24, the automation data 25, and the roles and permissions 28.

Figure 4:
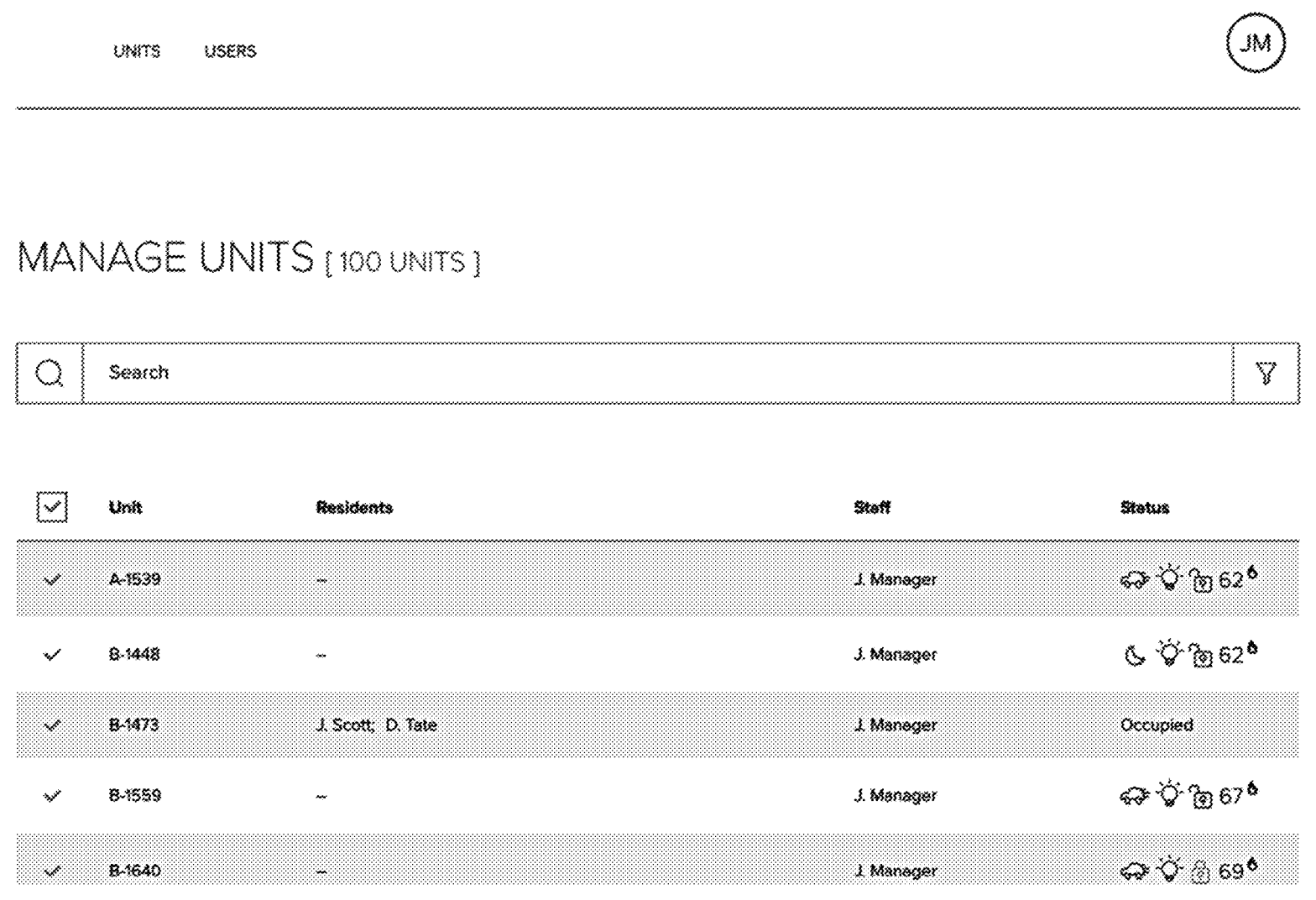

FIGS. 4-11 illustrate example user interfaces generated by the automation environment 20 shown in FIG. 1. The user interfaces are not exhaustive but illustrate a number of different examples. FIG. 4 illustrates an example user interface for managing rental units (also "units"). In this embodiment, the interface access engine 23 has determined that a user account with the role of property manager should be provided a list of units. This list would not, for example, be provided to a user account with the role of resident. The property manager is thus able to see a list of units, the vacancy status of those units, assigned staff members, and the automation settings of one or more automation devices at each unit (among potentially other information). The example interface can be generated by the interface engine 21 to allow property managers to view, control, and access only those units for which the property manager is authorized. Here, as shown in FIG. 4, the property manager may not have authorization to access or control the home automation features of a unit having an "occupied" status. In various embodiments, the status can be manually set to occupied, vacant, or automatically identified as occupied or vacant based on whether residents are associated with the unit, whether a specific date has been reached, etc.

Figure 5:
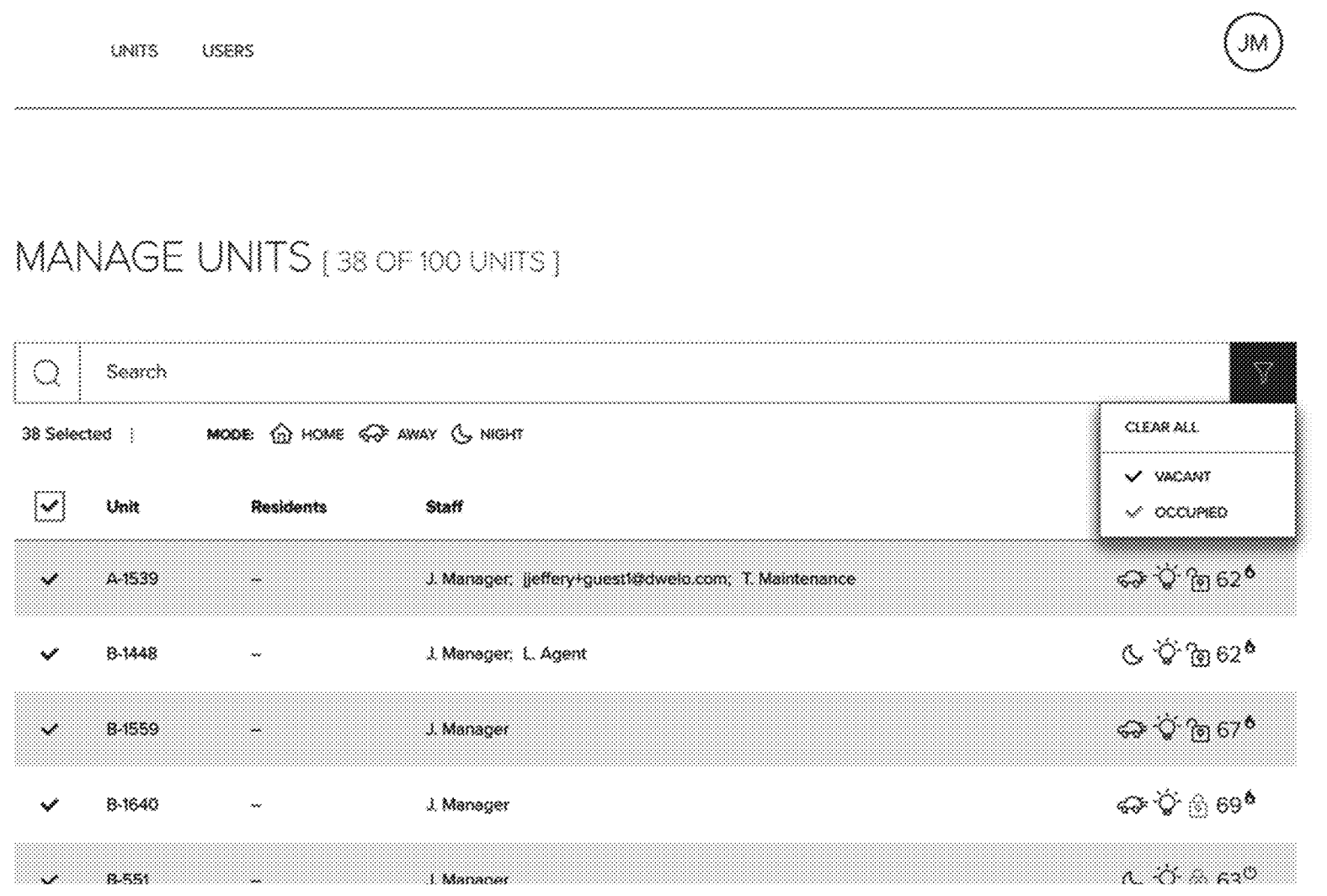

FIG. 5 illustrates another example user interface for managing rental units. Several rental units have been associated into a group that can be logically organized and managed together. In this example, the user interface has provided a property manager an interface to manage automation settings at multiple dwellings. The property manager can select, for example, a status (e.g., vacant) and filter a list of units by that status. Thus, a property manager can manage a subset of units having that status through the example interface shown in FIG. 5.

Figure 6:
Figure 7:
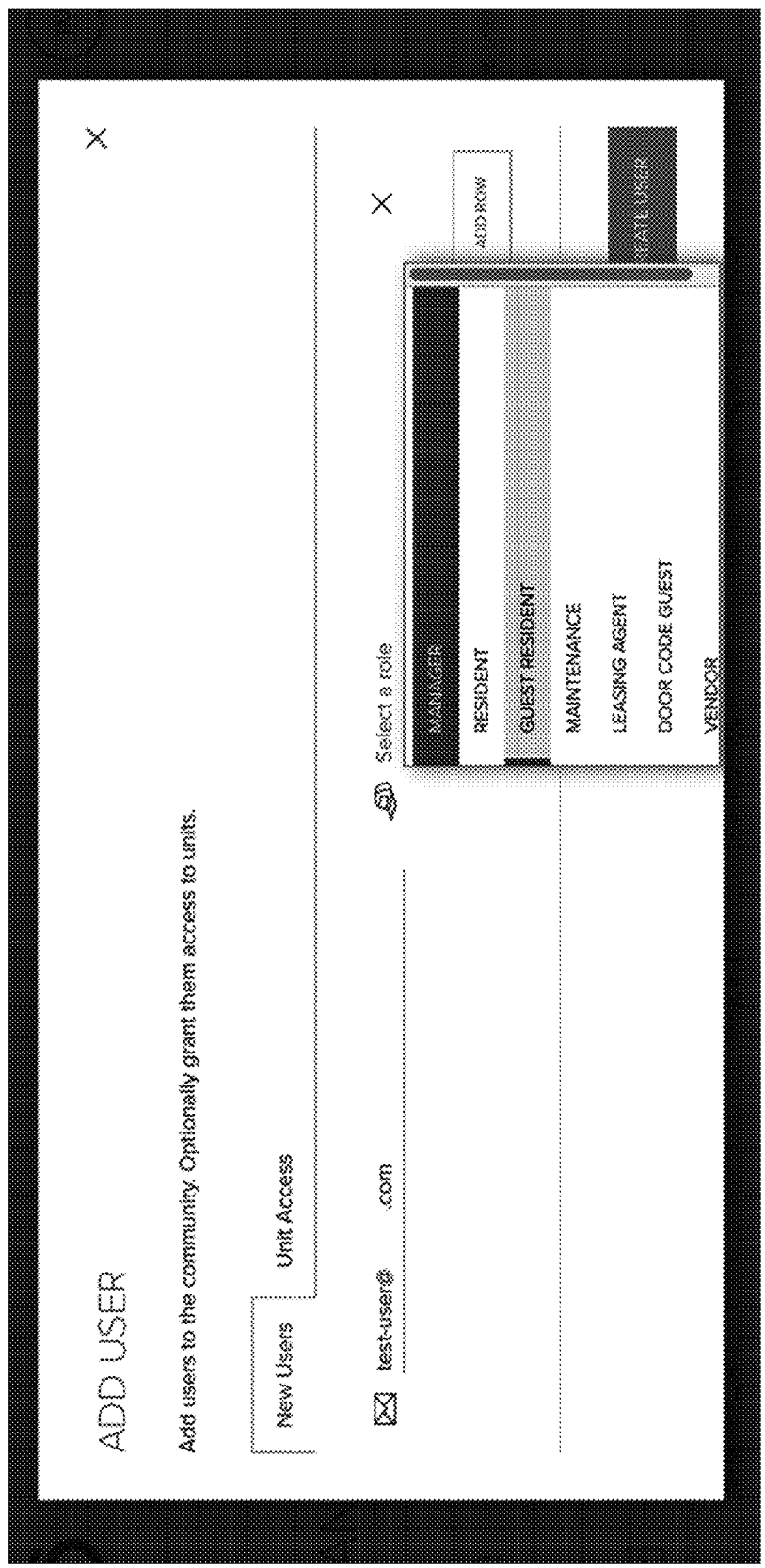
Figure 8:

FIGS. 6-8 illustrate example user interfaces for managing residents, guest residents, maintenance (e.g., staff), leasing agents, vendors, door code guests, and other users. Referring to FIG. 6, an example user interface to manage residents' access to the system is shown. Property managers can use this interface to add and onboard (e.g., manage) residents, grant and revoke users access to the automation capabilities in certain dwellings, grant and revoke user access to control the automation capabilities in certain dwellings, and control the automation capabilities in certain dwellings. In one embodiment, residents are associated with a unit and a hub within that unit. User access roles and permissions can be provided, for example, a resident can be granted access to a hub within his or her unit which keeps the resident's control limited to the automation devices in his or her unit.

Referring next to FIG. 7, shown is another example user interface for managing users' access to the system. A property manager can add a new user using the new user interface screen shown. As mentioned above, users can be associated with a role (e.g., guest resident) and the user assigned to a particular unit. Thus, the system can provide further security at a user and unit level including access rights, control rights, and viewing rights.

FIG. 8 shows yet another example user interface for managing users. A property manager can, for example, add a user with role "staff" to a unit to provide the staff user with access (e.g., a door code that opens a door lock at the unit). A door code can be, for example, unique and random. Door codes can be provided to any user. Whenever a user is granted access to a unit, his or her door code is added to the lock and he or she is thus able to open the door using his or her door code. The system can provide that all door codes are unique community-wide. Further, the system can regenerate door codes that continue to be unique even if a user migrates across communities. The system can also require a code to be random, and not allow door codes to be chosen by the user. Thus, for example, the system can provide a one-user-one-code paradigm that facilitates tracking of user access. Thus, it is possible to track a staff member's (or other person's) entry into a unit. Finally, in another embodiment, the system can sense when a user code is shared (e.g., if the staff member shared a door code with other staff members) and the system can automatically reset the door code.

As discussed previously, user access roles and permissions and the interface access engine can control user permissions and access at a granular level. For example, a property manager could select a user and allow that user access to only common areas, and limit that user's access to occupied units.

Figure 9:
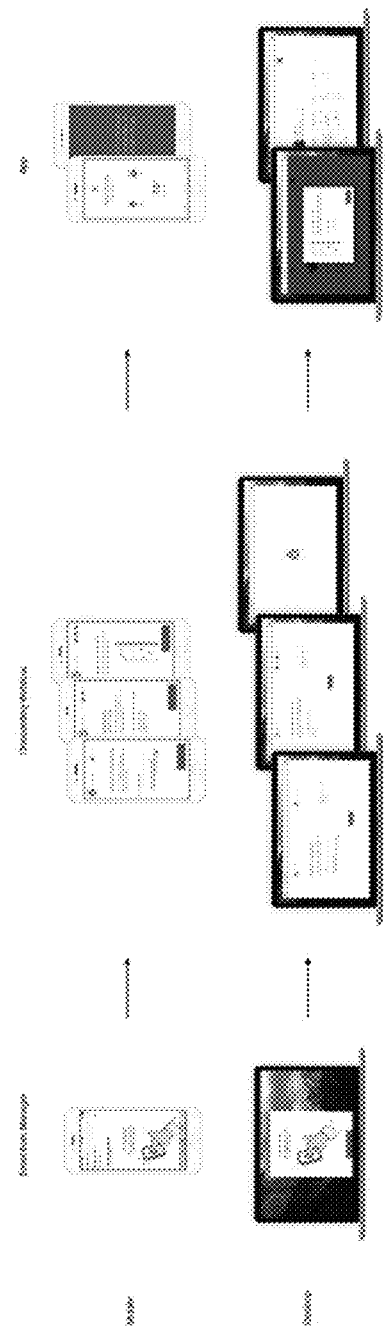

FIG. 9 illustrates an example diagram for interactions of user interfaces and user devices in various embodiments. For example, one aspect of the system can provide a user on a mobile device with a workflow that begins with an email from a manager, continues through an onboarding workflow, and leads finally to a user being granted access to a unit. Thus, the user is able to access automation devices located within that unit using a mobile application. In other cases, the workflow on a desktop device can begin with an email from a manager, continues through an onboarding workflow, and leads finally to a user being granted access to a unit. Thus, the user is able to access automation devices located within that unit using a desktop application (e.g., a web browser).

Figure 10:
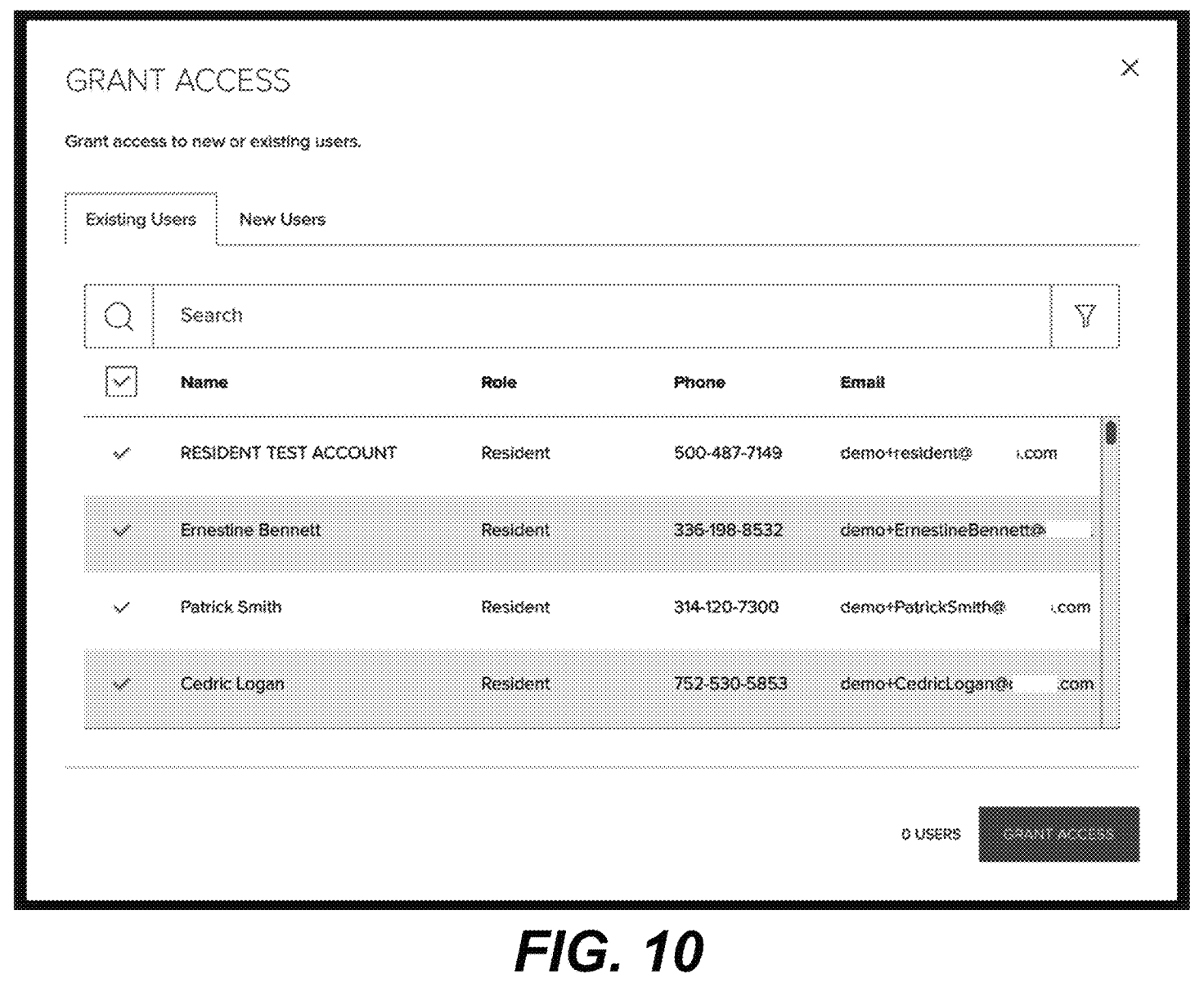

FIG. 10 shows another example user interface for managing users. In this example, rather than adding a new user to the system, a property manager has selected an existing user from the list of users. One aspect of the user interface is to provide a user with a user interface to allow creation of automation rules (e.g., automate the granting and revoking of user access). An automation rule could for example automate certain steps commonly carried out when a unit transitions between a vacant and an occupied state (or when a resident transitions from one unit to a different unit). The property manager could, for example, select the four existing users as shown in FIG. 10, and automations provided through the user interface could automate the steps of transitioning these residents from one unit to a different unit.

Additionally, since vacant units can require a lot of work from management or staff, automations can be created to specifically address the needs of work staff. In one embodiment, automation devices in vacant units can be set to automatically turn off and lock up at night, saving energy and ensuring security. In another embodiment, property managers can choose which vendors to provide with automatic access to a unit upon that unit's entry into vacant status by selecting from a list of outside contractors (e.g., those contractors with whom the property managers work frequently). Additionally, automations can be set up to revoke automatically granted access when units become occupied.

Figure 11:
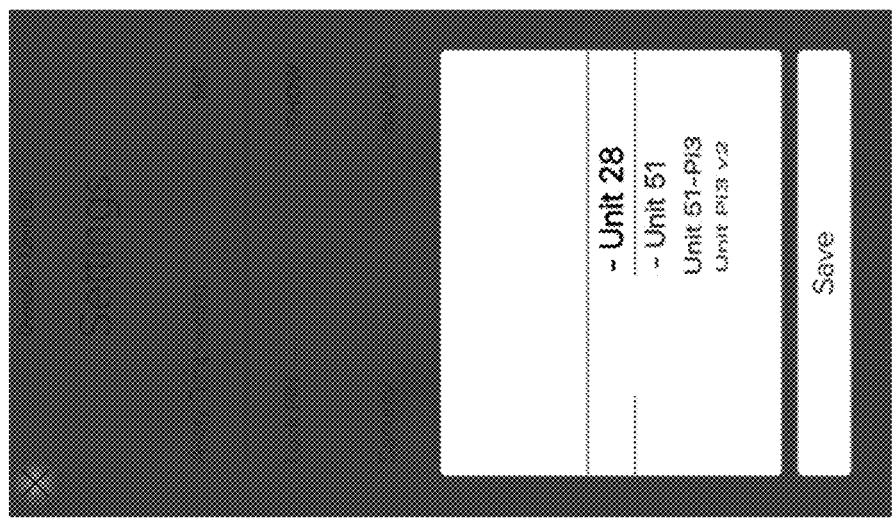
Figure 11:
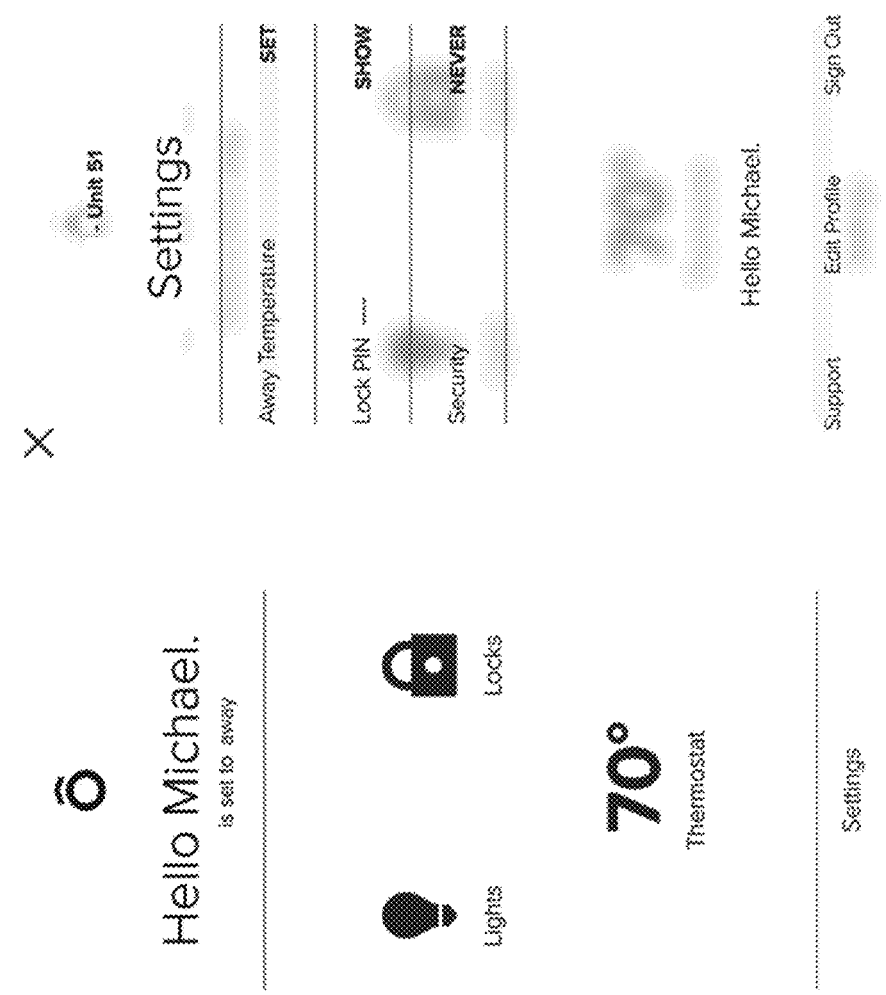

FIG. 11 shows another example user interface for a mobile application for dwelling automation administration. The mobile application shown provides a user with access to automations and automation device settings from a mobile device. Here, for example, a staff member may have access to four units. The interface access engine can determine which units the staff member has access to. According to the staff member's role, the staff member may have been granted access to the units manually, or some other method of user access control such as those described above. Thus, a staff member can view, access, and control those automation devices according to his or her role, but cannot view, access, or control those automation devices associated with units for which the staff member is not authorized.

The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

The computing devices described herein can include at least one processing circuit. The processing circuit can include, for example, one or more processors and one or more storage devices that are coupled to a local interface. The local interface can include, for example, a data bus with an accompanying address/control bus or any other suitable bus structure. The one or more storage devices can store data or components that are executable by the one or more processors of the processing circuit. For example, interface engine 21, management engine 22, interface access engine 23, automation engine 31, and other components can be stored in one or more storage devices and be executable by one or more processors in the computing devices.

The interface engine 21, management engine 22, interface access engine 23, automation engine 31, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in a non-transitory computer-readable medium for use by or in connection with an instruction execution system such as one of the processors or processing circuits described herein. The computer-readable medium can contain, store, and/or maintain the software or program instructions for use by or in connection with the instruction execution system. A computer-readable medium can include a physical media, such as, magnetic, optical, semiconductor, and/or other suitable media. Examples of suitable computer-readable media include, but are not limited to, solid-state drives, magnetic drives, or flash memory.

Further, any logic or applications described herein, including the interface engine 21, management engine 22, interface access engine 23, and automation engine 31 can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All modifications and variations are intended to be included herein within the scope of this disclosure and protected by the following claims.

For example, the embodiments are not limited to any particular type of dwelling. Instead, the embodiments can be applied to type of residence, for example, regardless of whether described as a house, home, townhome, condo, apartment, etc. Similarly, the embodiments are not limited to use in residences, because the concepts described herein can be applied to commercial, industrial, and other types of properties.

Additionally, any number of the functions described as being performed by the automation hub 30 can be incorporated into the automation environment 20. For example, in the case that one or more of the automation devices 60-63 includes a communications interface capable of a direct communications link to the network 40 (e.g., a cellular interface), the automation environment 20 can directly communicate with and administer the settings on the automation devices 60-63.

Therefore, the following is claimed:

1. A method for automation rights management, comprising:
receiving credential data from a client device for a user;
identifying, by at least one computing device, a right to access at least one function of a plurality of automation devices installed at and associated with different rental units at a managed residential property based on an evaluation of the credential data against an access control rule associated with automation management;
determining, by the at least one computing device, a group of the plurality of automation devices for which the user has the right to access the at least one function of the plurality of automation devices as a logical group; and
adapting a user interface on the client device to collectively administer the at least one function for the group of the plurality of automation devices as the logical group.

2. The method of claim 1, further comprising identifying, by at least one computing device, a role associated with the user based on the credential data.

3. The method of claim 2, further comprising identifying the right to access the at least one function of the plurality of automation devices based on the evaluation of the credential data and the role against the access control rule.

4. The method of claim 2, further comprising:
identifying the role associated with the user as at least one of a resident or an administrator based on the credential data; and
adapting the user interface to comprise at least one of a resident user interface or an administrator user interface based on the role.

5. The method of claim 1, further comprising:
receiving status data from the client device for the user; and
identifying the right to access the at least one function of the plurality of automation devices based on an evaluation of the credential data and the status data against the access control rule.

6. The method of claim 1, further comprising:
identifying a right to access at least one function of another automation device installed at and associated with a common area at the managed residential property based on the evaluation of the credential data against the access control rule.

7. The method of claim 1, further comprising:
identifying a constraint against access to at least one other function of the plurality of automation devices based on the evaluation of the credential data against the access control rule; and
adapting the user interface to prohibit access to the at least one other function of the plurality of automation devices based on the constraint against access.

8. The method of claim 1, further comprising:
capturing automation management instructions from the client device through the user interface; and
transmitting automation data to at least one automation device among the group of the plurality of automation devices based on the automation management instructions.

9. An automation rights management system, comprising:
a memory device to store computer readable instructions thereon; and a computing device configured, through execution of the computer readable instructions, to:

receive credential data from a client device for a user;

identify a right to access at least one function of a plurality of automation devices installed at and associated with different rental units at a managed residential property based on an evaluation of the credential data against an access control rule associated with automation management;

determine a group of the plurality of automation devices for which the user has the right to access the at least one function of the plurality of automation devices as a logical group; and adapt a user interface on the client device to collectively administer the at least one function for the group of the plurality of automation devices as the logical group.

10. The system of claim 9, wherein the computing device is further configured to identify a constraint against access to at least one other function of the plurality of automation devices based on an evaluation of the credential data against the access control rule.

11. The system of claim 10, wherein the computing device is further configured to:

adapt the user interface to prohibit access to the at least one other function of the plurality of automation devices based on the constraint against access.

12. The system of claim 9, wherein the computing device is further configured to:

identify a role associated with the user based on the credential data; and identify a right to access the at least one function of the plurality of automation devices based on the evaluation of the credential data and the role against the access control rule.

13. The system of claim 12, wherein the computing device is further configured to:

adapt the user interface to comprise at least one of a resident user interface or an administrator user interface based on the role.

14. The system of claim 9, wherein the computing device is further configured to:

capture automation management instructions from the client device through the user interface; and transmit automation data to at least one automation device among the group of the plurality of automation devices based on the automation management instructions.

15. A computer-readable medium storing computer-readable instructions thereon that, when executed by at least one computing device, directs the at least one computing device to perform a method for automation rights management, comprising:

receiving credential data from a client device for a user;

identifying a right to access at least one function of a plurality of automation devices installed at and associated with different rental units at a managed residential property based on an evaluation of the credential data against an access control rule associated with the user for automation management;

determining a group of the plurality of automation devices for which the user has the right to access the at least one function of the plurality of automation devices as a logical group; and adapting a user interface on the client device to collectively administer the at least one function for the group of the plurality of automation devices as the logical group.

16. The computer-readable medium according to claim 15, wherein the method further comprises:

capturing automation management instructions from the client device through the user interface; and transmitting automation data to at least one automation device among the plurality of automation devices based on the automation management instructions.

17. The computer-readable medium according to claim 15, wherein the method further comprises:

receiving status data from the client device; and identifying the right to access the at least one function of the plurality of automation devices based on an evaluation of the credential data and the status data against the access control rule.

18. The computer-readable medium according to claim 15, wherein the method further comprises:

identifying a role associated with the user as at least one of a resident or an administrator based on the credential data; and adapting the user interface to comprise at least one of a resident user interface or an administrator user interface based on the role.

19. The computer-readable medium according to claim 15, wherein the method further comprises:

identifying a right to access at least one function of another automation device installed at and associated with a common area at the managed residential property based on the evaluation of the credential data against the access control rule associated with the user for automation management.

20. The computer-readable medium according to claim 15, wherein the method further comprises:

identifying a constraint against access to at least one other function of the plurality of automation devices based on the evaluation of the credential data against the access control rule; and adapting the user interface to prohibit access to the at least one other function of the plurality of automation devices based on the constraint against access.

\* \* \* \* \*